United States Patent [19]

Kōda et al.

[11] Patent Number: 4,697,903
[45] Date of Patent: Oct. 6, 1987

[54] CAMERA BACK LID OPENING APPARATUS

[75] Inventors: Takao Kōda; Hirokazu Ichii, both of Saitama; Hiroshi Komatuzaki, Tokyo, all of Japan

[73] Assignee: Fuji Photo Film Co., Ltd., Kanagawa, Japan

[21] Appl. No.: 912,762

[22] Filed: Sep. 29, 1986

[30] Foreign Application Priority Data

Sep. 27, 1985 [JP] Japan ............................ 60-147840[U]

[51] Int. Cl.$^4$ .......................... G03B 1/00; G03B 17/02
[52] U.S. Cl. .................................................... 354/288
[58] Field of Search ..................... 354/202 R, 212, 288

[56] References Cited

U.S. PATENT DOCUMENTS

| | | | |
|---|---|---|---|
| 3,633,474 | 1/1972 | Erlichman | 354/288 |
| 4,072,970 | 2/1978 | Winkler | 354/288 |
| 4,332,453 | 6/1982 | Seely et al. | 354/288 |
| 4,429,976 | 2/1984 | Sekine | 354/288 |
| 4,469,421 | 9/1984 | Kamata | 354/288 |

FOREIGN PATENT DOCUMENTS 57-109931 7/1982 Japan.
58-57838 4/1983 Japan.
59-53344 4/1984 Japan.

Primary Examiner—A. A. Mathews
Attorney, Agent, or Firm—Young & Thompson

[57] ABSTRACT

In a drop-in loaded camera, a back lid is opened to its predetermined open position by magnetic repulsion produced by magnetic members disposed on the back lid and the camera body when releasing a back lid latch that keeps the back lid closed. The back lid thus opened is held in that open position by magnetic attraction, in which a film supply chamber is exposed at the bottom of the camera for the insertion of a patrone with a leader previously withdrawn therefrom. In that open position there is also provided a slot for the threading of the leader in an exposure position. The back lid is free to move farther open, beyond that predetermined open position, but against that magnetic attraction. In this way, the lid when released automatically seeks that partially open positon for film loading and unloading, but is more fully openable merely by pulling it farther open against the same magnetic force that tends to maintain it in the partially open position. Thus the camera can be fully opened for inspection, repair, etc. without the need to provide any additional structure.

7 Claims, 3 Drawing Figures

CAMERA BACK LID OPENING APPARATUS

BACKGROUND OF THE INVENTION

The present invention relates to camera back lid opening apparatus suitable for, in particular, drop-in loaded cameras.

In axially loaded cameras or drop-in loaded cameras, a patrone containing a coiled film strip with a film leader previously withdrawn therefrom is inserted endwise, i.e., axially into a film supply chamber of the camera body. The film supply chamber is opened at the bottom of the camera by opening a camera back lid having a rim adapted to overlap the bottom of the camera body. When the back lid is opened through a predetermined angle sufficient to insert the film patrone into the bottom opening to the film supply chamber, there is provided a slot at the bottom of the camera between the rim of the back lid and the camera body for threading the film leader into a path between the film supply and a film take-up chamber when inserting the patrone into the bottom opening to the film supply chamber.

When closing the back lid, the rim of the back lid closes the bottom opening and the threading slot and, at the same time, the film along the path is pressed against an exposure frame and is held in a fixed position in the axial direction of a taking lens of the camera by a pressure plate well known per se. The complete closing of the back lid causes an automatic film winding mechanism to start so as to wind the film leader around a take-up spool disposed in the film take-up chamber. This done, the camera is ready for an exposure. After all the exposures have been made and the film has been rewound into the patrone in a well known manner, the back lid is opened for allowing the patrone to be taken out through the bottom opening.

In a drop-in loaded camera, as described above, the back lid is usually prevented from opening more than a predetermined angle sufficient to provide the threading slot; however, it can be adapted to open more fully for easy access to interior mechanisms of the camera for inspection and repair.

To limit the opening of the back lid, it is necessary to provide, in a drop-in loaded camera, spring means for urging the back lid to open and stop means for holding the back lid opened at the predetermined angle against the spring means. In addition to these means, it is also necessary to provide means for disabling the stop means in order to allow the full opening of the back lid beyond the predetermined angle, for access to the interior mechanisms of the camera. The provision of such means makes the back lid opening mechanism complicated and requires an increased number of parts, which is obviously disadvantageous. Furthermore, from an operational point of view, it is troublesome to disable the stop means each time when opening fully the back lid.

OBJECTS OF THE INVENTION

It is therefore an object of the present invention to provide a camera back lid opening apparatus for normally preventing the back lid from being opened beyond a predetermined open position which needs no special means for allowing the back lid to be opened beyond that predetermined open position.

It is another object of the present invention to provide a camera back lid opening apparatus for normally preventing the back lid from being opened beyond a predetermined open position, which is simple in construction and operation.

It is a further object of the present invention to provide a camera back lid opening apparatus for normally preventing the back lid from being opened beyond a predetermined open position, which is suitable for drop-in loaded cameras.

SUMMARY OF THE INVENTION

For achieving the above objects of the present invention, the camera back lid opening apparatus of the present invention comprises first and second magnetic means disposed on a camera body and a back lid hinged to the camera body for opening and closing movement so as to produce magnetic repulsion and attractive force between them. The back lid is latched by a latching means in its closed position against this magnetic repulsion. Upon releasing the latching means, the back lid is repelled by the magnetic repulsion to open to the predetermined open position and is held by the magnetic attractive force in the same position. The back lid in the predetermined open position both opens a film supply chamber and provides a narrow slot, at the bottom of the camera body. As a result, a film container such as a patrone, with a film leader previously withdrawn therefrom can be inserted endwise, i.e. axially into the film supply chamber as the film leader is threaded in the slot.

BRIEF DESCRIPTION OF THE DRAWINGS

For a fuller understanding of the present invention, reference should be made to the following detailed description and the accompanying drawings wherein.

DETAILED DESCRIPTION OF THE INVENTION

Figure 1:
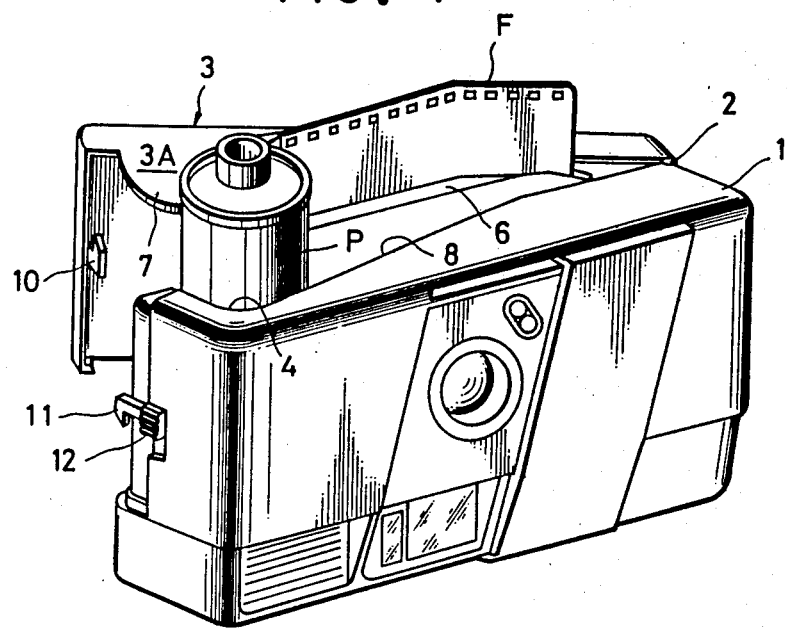
FIG. 1 is a perspective view of an inverted camera with its back lid opened to a predetermined open position, embodying the present invention.
Figure 2:
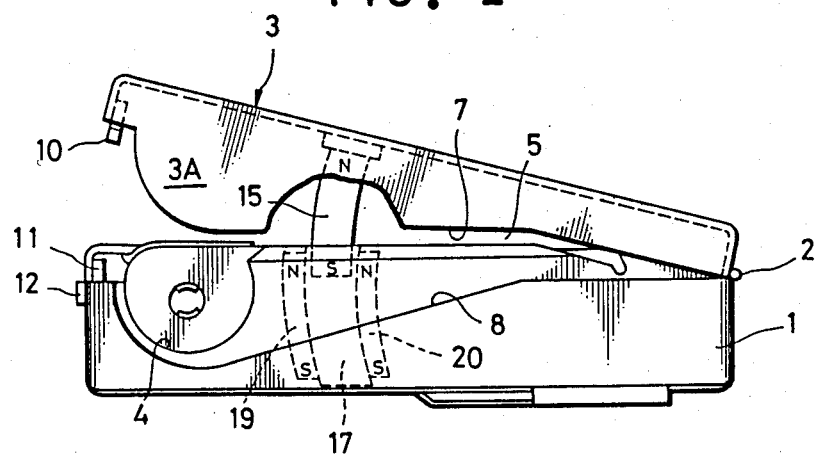
FIG. 2 is a bottom view of the camera shown in FIG. 1.

Referring now to FIGS. 1 and 2 showing a drop-in loaded camera embodying the present invention, upside down, in which a back lid is opened to a limited open position for film loading, a back lid 3 having a rim 3A at its bottom (shown uppermost in FIG. 1) is attached to a camera body 1 by means of a hinge 2 for opening and closing movement. As is well known in such drop-in loaded cameras, a film patrone P containing a coiled film with its leader F withdrawn therefrom is inserted endwise, i.e. axially through a bottom opening 4 into a film supply chamber. With the back lid 3 in this limited predetermined open position, there is provided, at the bottom of the camera, a bottom opening 4 for the insertion of the patrone P and a narrow slot 5 (see FIG. 2) for threading the leader F, which is defined between the edges of the bottom of the camera body 1 and the rim 3A of the back lid 3. For easy threading, the edge 8 of the bottom of the camera body 1 is inclined.

The rim 3A of the back lid 3 has a curved outline that merges smoothly into an inclined edge 7 of rim 3A, these rounded and inclined edges of rim 3A just matching those of the bottom of the camera body 1, thereby keeping the inside of the camera light-tight when the back lid 3 is closed. The back lid 3 can be held in its closed position by a latching comprising hooks 10, 11 disposed on the back lid 3 and the camera body 1 which are releasable by sliding a button 12 on the outside of the camera body 1.

Figure 3:
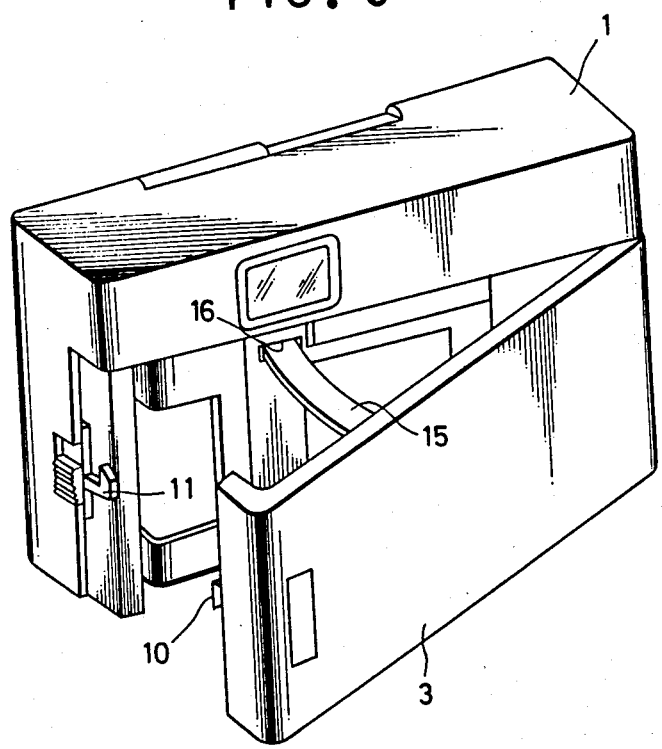
FIG. 3 is an upper rear perspective view of the camera shown in FIG. 1.

As shown in FIGS. 2 and 3, there is provided inside and at the top of the back lid 3 a magnetic arm 15 which is a permanent magnet having a circularly curved shape having the center of its arc at the hinge 2 and having magnetic pulses, S at one end and N at the oppposite end. On the camera body 1, there is an opening 16 at a position out of the path of forwarding the film F, communicating with a groove 17 which is formed as a sheath having the same circularly curved shape as of the magnetic arm 15 so as to allow the magnetic arm 15 to move freely in the groove 17 when opening and closing the back lid 3. On opposite sides of the groove 17 there are magnetic guide members 19, 20 fixed to the camera body 1 which are also permanent magnets having magnetic poles, N at one end and S at the opposite end. Magnetic arm 15 and magnetic guide members 19, 20 are so arranged that the magnetic pole S of the magnetic arm 15 is between the magnetic poles S of the magnetic guide members 19, 20 when the back lid is closed and the hooks 10, 11 are engaged, and between the magnetic poles N when the back lid 3 is opened to the film-receiving position shown in FIG. 2.

In the camera described above, when the back lid 3 is closed and the hooks 10, 11 are engaged, the S poles of the magnetic guide members 19, 20 repel the S pole of the magnetic arm 15. Therefore, once the button 12 is operated to disengage the hooks 10, 11, the back lid 3 is swung open to the film-receiving position about the shaft of the hinge 2 by the repulsion between the magnetic arm 15 and the magnetic guide members 19, 20. When the back lid 3 has thus opened to the position shown in FIG. 2, the N poles of the magnetic guide members 19, 20 attract the S pole of the magnetic arm 15 to restrain the back lid 3 from opening beyond the position shown in FIG. 1. At this limited open position, the back lid 3 opens the bottom opening 4 and provides the slot 5 for the threading of the film leader F, the camera then being ready for easy film loading. Prevention of the wrong insertion of the film leader F is achieved by limiting the opening of the back lid 3 to this predetermined open position, which is predetermined by the length of the magnetic arm 15.

If it is required to open the back lid 3 beyond the predetermined limit position for the purpose of inspection, repair, etc. of the interior mechanisms of the camera, the back lid 3 can be manually swung beyond the illustrated limit position by applying an external force thereto which is greater than the attractive force between the magnetic arm 15 and the magnetic guide members 19, 20.

When back lid 3 is closed, the magnetic arm 15 is thrust between the magnetic guide members 19, 20 against the attractive force and then the repulsion force between the respective poles, until the hooks 10, 11 engage and lock with each other.

Since certain changes may be made in the above-described apparatus without departing from the spirit and scope of the invention involved herein, it is intended that all matter contained in the above description or shown in the accompanying drawings shall be interpreted as being merely illustrative and not limiting.

What is claimed is:

1. In a camera back lid opening apparatus of the type wherein a back lid is attached to a camera body for opening and closing movement and is adapted to be opened to a predetermined position by releasing back lid latching means for allowing a film container with a leader previously withdrawn therefrom to be inserted endwise into a film supply chamber of said camera body; the improvement comprising first means having magnetic poles in opposition to each other at its opposite ends which is disposed on said back lid;

second means having magnetic poles in opposition to each other at its opposite ends which is disposed on said camera body; and said first and second means being so associated with each other as to produce therebetween magnetic repulsion when said back lid is in its closed position and magnetic attraction when said back lid is in said predetermined position, whereby said back lid is repelled by said repulsion to open upon releasing said back lid latching means and is held opened in said predetermined open position by said attraction.

2. An apparatus as defined in claim 1, wherein said back lid held opened in said predetermined position opens said film supply chamber at the bottom of said camera body for allowing the insertion of said container and provides between said camera body and back lid at the bottom thereof a narrow slot through which said leader is threaded.

3. An apparatus as defined in claim 2, wherein said first means is a circularly curved permanent magnetic extending toward said camera body and said second means is a pair of circularly curved permanent magnets so disposed as to provide a groove which allows said first means to move slidably therein, said magnetic poles being disposed at the ends of said magnets.

4. An apparatus as defined in claim 3, wherein said first permanent magnet has a length by which said predetermined open position is defined.

5. An apparatus as defined in claim 1, wherein said back lid is free to open beyond said predetermined position against said magnetic attraction.

6. In a back lid opening apparatus of a camera for use with a film container with a leader previously withdrawn therefrom, said back lid being attached to a camera body for opening and closing movement and being adapted to open to a predetermined open position for allowing the insertion of said film container into a film supply chamber of the camera body and the threading of said leader in an exposure position of the camera; the improvement comprising first magnetic means for producing magnetic repulsion of said back lid in a direction toward said open position when said back lid is in its closed position, said first magnetic means being provided partly on said back lid and partly on said camera body;

second magnetic means for producing magnetic attraction of said back lid toward said predetermined position, said second magnetic means being provided partly on said back lid and partly on said camera body; and means for releasably latching said back lid in said closed position against said repulsion, said latching means, upon being released, allowing said back lid to be repelled by said magnetic repulsion to said predetermined position and to be held therein by said magnetic attraction, thereby both opening said film supply chamber and providing between said back lid and camera body a narrow slot communicating with said exposure position.

7. An apparatus as defined in claim 6, wherein said back lid is free to open beyond said predetermined position against said magnetic attraction.

* * * * *